(12) United States Patent
Oberg

(10) Patent No.: US 6,792,671 B1
(45) Date of Patent: Sep. 21, 2004

(54) METHOD FOR MANUFACTURING AND APPLICATION OF HEATING ELEMENT FOR HEATING IN A VEHICLE

(75) Inventor: Peter Oberg, Sandhem (SE)

(73) Assignee: Kongsberg Automotive AB (SE)

( * ) Notice: Subject to any disclaimer, the term of this patent is extended or adjusted under 35 U.S.C. 154(b) by 0 days.

(21) Appl. No.: 10/070,836

(22) PCT Filed: Sep. 15, 2000

(86) PCT No.: PCT/SE00/01798

§ 371 (c)(1),
(2), (4) Date: Dec. 10, 2002

(87) PCT Pub. No.: WO01/19220

PCT Pub. Date: Mar. 22, 2001

(30) Foreign Application Priority Data

Sep. 16, 1999 (SE) .............................................. 9903324

(51) Int. Cl.[7] .............................. H05B 3/00; H05B 1/00
(52) U.S. Cl. ......................... 29/611; 29/610.1; 29/612; 29/618; 29/825; 29/831; 219/217; 219/544; 297/180.12; 5/421
(58) Field of Search ......................... 29/620, 831, 844, 29/885, 887, 825, 611, 612, 618, 623.4, 830, 835; 219/526, 527, 528, 529, 543, 436, 548, 217; 156/177, 205; 5/421; 297/180.1, 180.12, 180.15; 338/211, 217, 309

(56) References Cited

U.S. PATENT DOCUMENTS 3,440,408 A * 4/1969 Brittan ........................ 219/522
4,044,221 A 8/1977 Kuhn
4,455,481 A * 6/1984 Van Hoof et al. ............. 29/611
4,695,091 A * 9/1987 Altmann et al. ............. 297/180
4,825,048 A * 4/1989 Altmann et al. ............. 219/528
4,964,674 A * 10/1990 Altmann ..................... 297/180
6,179,378 B1 * 1/2001 Baumgartner et al. . 297/180.12
6,489,595 B1 * 12/2002 Check et al. ................ 219/217

FOREIGN PATENT DOCUMENTS

GB 2 070 400 A1 9/1981
GB 94/09684 A1 5/1994

* cited by examiner

Primary Examiner—Minh Trinh
(74) Attorney, Agent, or Firm—Lerner, David, Littenberg, Krumholz & Mentlik, LLP

(57) ABSTRACT

Method for production and application of a heating element for heating in vehicles where the heating element consists of heating wire defining at least one electric heating loop extending in a predetermined pattern including positioning the heating wire onto one side of a carrier; applying adhesive over the carrier, at least over areas where the heating wire is lying and over the heating wire, so the heating wire adheres to the surface of the carrier; transporting the carrier with the heating wire to a substrate, wherein the heating wire is adjacent to the substrate; pressing the heating wire against the substrate; heating and melting the adhesive to separate the heating wire from the carrier leaving the heating wire adhered to the substrate; and, removing the carrier, so the heating wire is released from the carrier and adheres to the substrate, to form the heating element for heating in the vehicle.

6 Claims, 3 Drawing Sheets

METHOD FOR MANUFACTURING AND APPLICATION OF HEATING ELEMENT FOR HEATING IN A VEHICLE

TECHNICAL FIELD

The present invention relates to a method for the production and application of a heating element for heating in vehicles, the heating element consisting of a heating wire defining at least one electric heating loop extending, in its operating position, in a predetermined pattern.

STATE OF THE ART

It is previously known to produce heating elements for vehicles constructed from an electrically conducting heating loop that is applied onto a layer of material. Conventional heating elements are produced as separate products intended to allow rough handling, for example retrofitting into existing vehicle seats. The heating element itself or the surrounding layers of material have had to function as a protective and carrying layer and have been given such a thickness that the heating elements have been noticeable to the user, due to stiffness as well as level differences in the seat around the edges of the element. Further, the increasing cost hunt on vehicle components has raised the demand for low manufacturing costs, with regard to material as well as mounting costs.

The object of the present invention is to provide a method for the production and application of a heating element for vehicles that solves the problems discussed above in such a way that for example vehicles can be equipped with heating elements at a very limited additional cost, enhancing the driving comfort.

DISCLOSURE OF INVENTION

Said object is achieved by means of a method characterised by the steps of:

positioning the heating wire onto at least one side of a temporary carrier, applying an adhesive over said carrier, at least over those areas where the heating wire is lying on the carrier, and over the heating wire, causing the heating wire to adhere to the surface of the carrier, transporting the carrier with the heating wire to a final substrate, which the heating element is to be in close contact with, pressing the heating wire against the substrate, heating the adhesive so as to make the wire adhere to the substrate, and removing the carrier, so that the heating wire is released from the carrier and adheres to the substrate, to form the heating element for heating in the vehicle.

DESCRIPTION OF DRAWINGS

The invention will be described in further detail below, by way of an embodiment example, with reference to the enclosed drawings, of which

PREFERRED EMBODIMENT

The basic thought of the present invention is to provide a heating element with as simple a construction as possible, and to limit the handling stages and handling times of the element before fitting it into its final location, e.g. in a vehicle seat. Through this, the demands for easy handling of the mechanical construction of the element before fitting can be lowered, thus reducing the additional cost of providing a vehicle with heating elements. The heating element is thus intended for heating in a vehicle, the power source commonly being the vehicle generator and battery. The heating element is generally intended for heating a vehicle seat, for example its bottom, backrest or headrest, in order not to chill the vehicle driver or passenger. The heating element can also be arranged at other locations in the vehicle passenger compartment, for example in armrests panels, floor, door panels and roof, in order to maintain a warm and comfortable environment.

Figure 1:
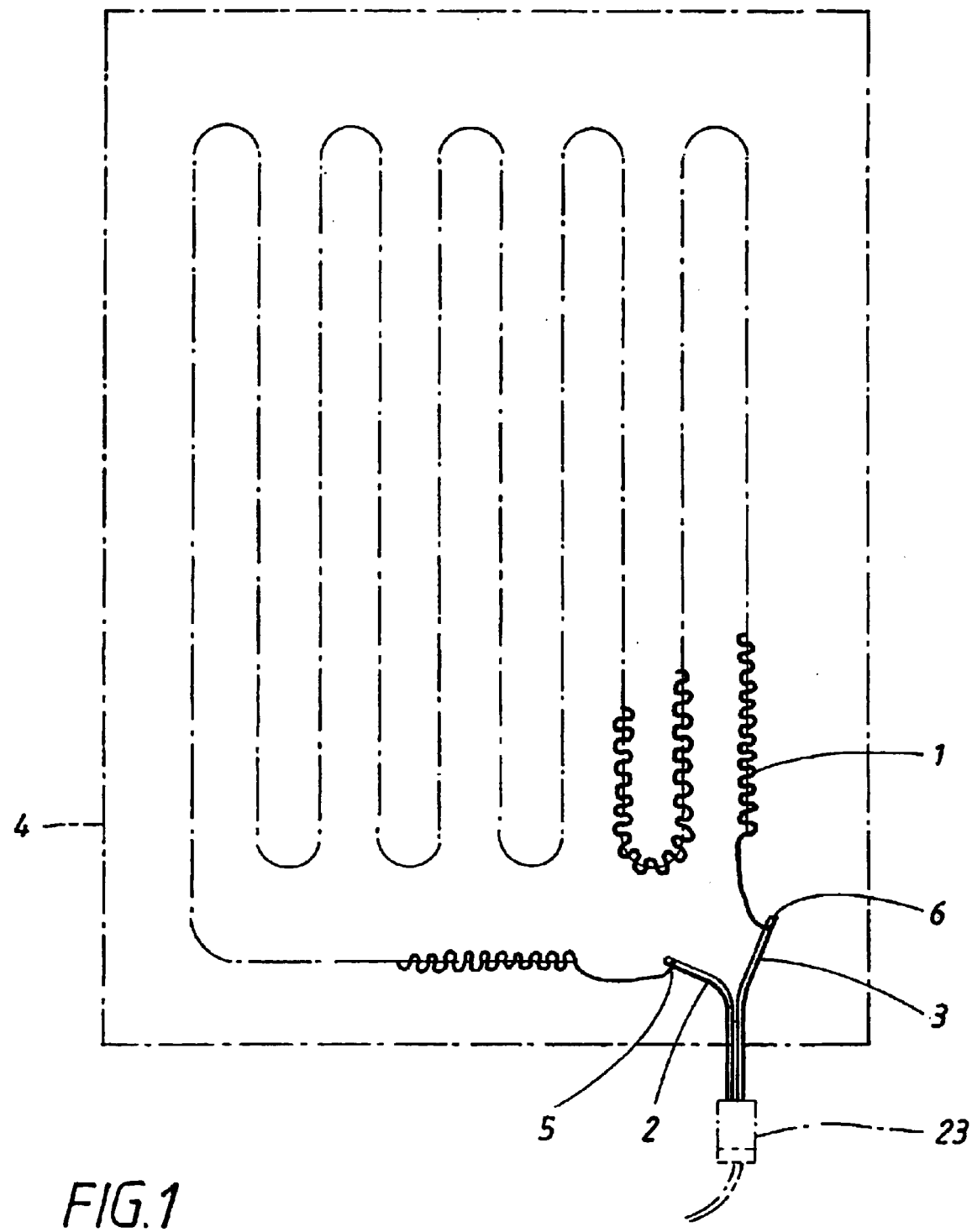
FIG. 1 is a top view, schematically illustrating the construction of one example of a heating element for use with the method according to the invention.

The active component of the heating element is a heating wire 1, normally consisting of metal or carbon fibre, or being spun from filaments with different properties. The heating wire 1 is of the electrical resistance wire type, that is, a wire developing heat due to its high resistance when passed by an electric current, said current in turn being obtained through two feeder lines 2, 3 that may or may not be insulated, connected to a (not shown) electric power source and, in a handling stage to be described in further detail below, applied through gluing onto a flexible carrier 4, as hinted by dot dashed lines in FIG. 1. The carrier may be paper or a plastic film, and, preferably, as such electrically non-conductive.

The resistance wire is made with an appropriately adapted resistance for generating heat during application of a voltage across the terminal ends 5, 6 of the wire through the feeder lines 2, 3. The resistance is chosen by selecting the values of various parameters, such as the wire material resistivity, the wire diameter and its length. The wire may be uninsulated, or insulated with a conventional insulating material. The method according to the invention will now be described, with reference to FIGS. 2, 3, 4, 5 and 6. The carrier 4 mentioned above, during rational production, is produced as a continuous web, uncoiled from a not shown roll and conveyed through a plant for producing heating elements. The transportation medium may consist of a not shown conveyor in the form of an endless conveyor belt, supporting the carrier and feeding it, either step-wise or continuously, through various stations in the manufacturing process. Initially, the heating wire 1 is applied, likewise being uncoiled from a not shown roll and applied into its predetermined pattern to form the active component of the heating element. The positioning is e.g. made by winding the wire around a number of fixed nails or pins defining a positioning fixture for the wire. This could be made either manually, or automatically by means of a robot. The "small" sinus shape, i.e. the serpentine shape superimposed upon the major serpentine shape, is preferably selected for absorbing the load from e.g. a person in a vehicle seat and allow stretching of the heating wire. This smaller sinus shape is preferably preformed in an earlier stage. Another serpentine shape is of course conceivable. As can be gathered from FIG. 2, the wire is positioned practically in contact with the carrier 4.

Figure 2:
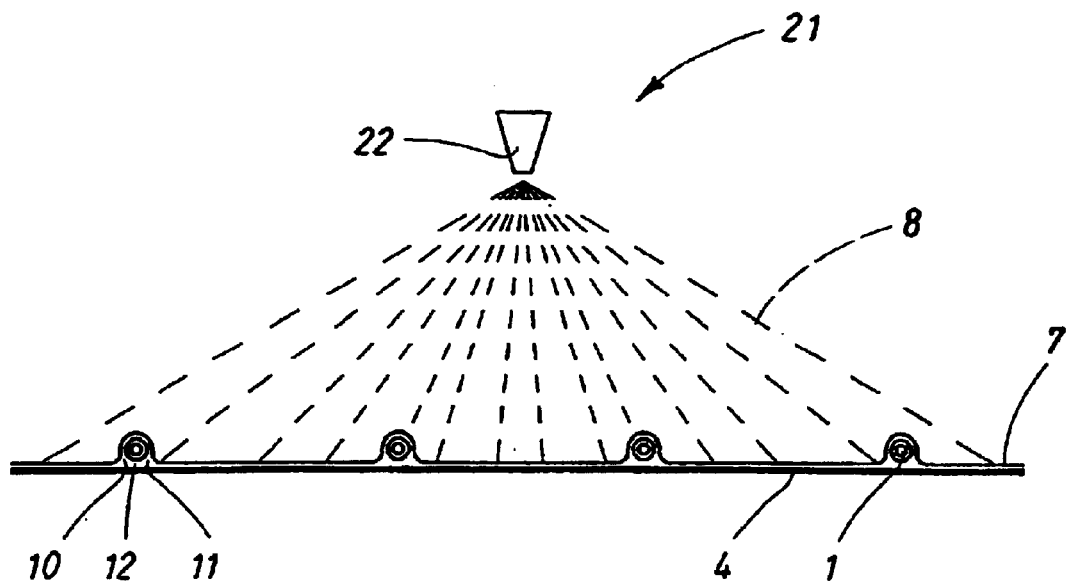
FIG. 2 shows a partially broken section, in an enlarged scale, of the heating element during a manufacturing stage.

FIG. 2 hereby illustrates a schematic cross-section through the carrier and thus cross-sections through some loop portions of the heating wire 1. At a station 21 for application of adhesive, shown in FIG. 2, the chemical bonding agent is applied, preferably in the form of a spray glue, through spraying of preferably the entire carrier surface, more specifically the topside 7 thereof, or at least those portions of the carrier where the heating wire 1 extends. The spray glue 8 is supplied from a number of not shown nozzles above the carrier and the heating wire. Through the carrier 4 advantageously having certain absorbing properties, the spray glue will penetrate almost entirely into the carrier material, and thus will not form any strongly adhesive surface coating upon the carrier. On the other hand, an adhesive layer 9 or glue layer will be applied onto the heating wire 1, over its entire length on the carrier 4. The glue is of the thermo-glue type, whereby the glue in the nozzles and during application onto the heating wire is kept heated to a temperature above the glue melting temperature, entailing hat the glue will be in liquid form or at least have adhesive properties. In practice, the glue outside of the nozzles will transform into filaments, settling like a "spun" surface across the heating wire 1 and the topside 7 of the carrier 4. Either the entire topside, or selected areas along the wire loop can be coated. The glue is applied in such a quantity that it will settle also in an area 10, 11 between the heating wire 1 and the carrier 4 on both sides of the wire, and will practically flow in under the wire. Hereby, the adhesive or glue will provide an attachment between the heating wire 1 and the carrier. As the carrier with the heating wire is subsequently conveyed to an area with a temperature below the melting point of the glue, in the case of thermo-glue, the glue will harden and form an efficient attachment of the heating wire 1 in its determined position or distribution relative to the carrier 4.

After a completed application and attachment of the heating wire to the carrier 4 in the manner described above, the carrier 4 may, at the final end of the machine, be wound up into a roll for further transportation e.g. to the subsequent intermediate user or end user. As an alternative, the carrier and heating wire could be cut transversally into predetermined units, e.g. into the rectangular shape indicated by a dot-dashed line in FIG. 1. The heating wire may thereby have such an extension as to run continuously across from one carrier unit to another for a rational production, and the wire would then be cut in the same step as the transversal cutting of the carrier 4. The web material would then either have the same width as the final width of the carrier, or two or more carriers might be arranged side by side, whereby longitudinal cutting would also be performed at a suitable stage. The carrier 4 is, however, according to the invention, only a temporary carrier or transportation carrier, intended for upholding the shape and location of the heating wire 1 and enable its handling before being given its final location in an intermediate product or an end product.

Figure 3:
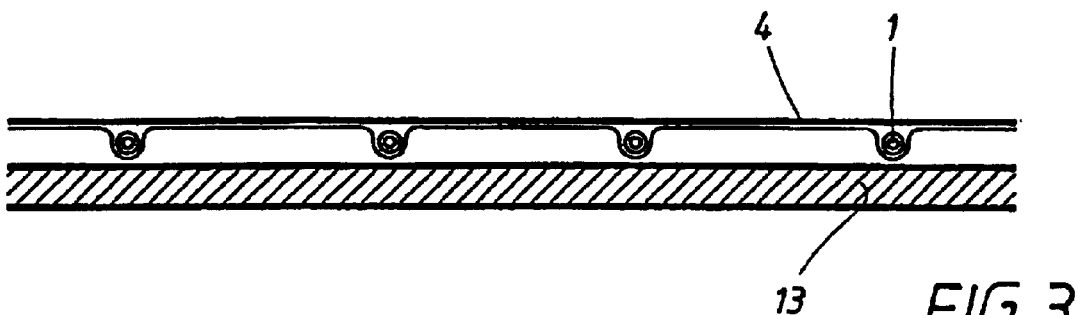
FIGS. 3–5 shows the corresponding section during an application stage.

FIG. 3 illustrates a later stage in the handling of the heating element according to the method of the invention. This stage may be a later stage in a continuous process in one and the same machine described above, but may also be a handling stage at an intermediate user's or an end user's. Common for the different cases is that the heating element is to be placed onto a substrate 13, defining some kind of a covering layer inside a vehicle, preferably in a vehicle passenger compartment. This substrate 13 could be a textile upholstery layer defining the upholstery of a vehicle seat. The upholstery layer may hereby for example be provided with the heating element already at an upholstery manufacturer, who will supply the upholstery layer equipped with a heating element. Alternatively, the heating element may be applied to the upholstery layer in connection with the production of a vehicle seat, to be described further below. With the term substrate is meant a base surface, not necessarily located below the heating element but just as well a side surface or a surface turned downwards, such as a ceiling.

The carrier thus functions as a temporary carrier for storage and transportation of the heating element and for application of the heating element onto the substrate. By substrates turned upwards, such as in FIG. 3, the carrier is positioned upside down in relation to the stage according to FIG. 2, the heating wire being located on the bottom side of the carrier. The carrier is either handled unit-wise, for example manually, by being positioned, with the heating wire 1 turned downwards, against the substrate 13, that is, the topside 14 thereof. The carrier with the heating wire is advantageously applied to the substrate 13 using a certain pressure, e.g. with weights. The adhesion of the heating wire 1 will take place by heating the heating wire 1 as well as the substrate 13 to a temperature above the melting temperature of the thermo-glue, entailing that the thermo-glue will melt so as to be activated into adhesion, affixing the heating wire to the substrate. The heating is obtained by the heating wire 1 already at this stage advantageously being connected to the feeder lines 2, 3, which in turn are connected to a connector means 23 (see FIG. 1). Via the connector means, the heating element is connected to an electric power source, causing an electric current to flow through the heating wire. Said current is of such strength as to cause the heating described above. As illustrated schematically in FIG. 4, the heating and the meting of the glue entails, that the glue surface at the heating wire 1 is parted, reducing the adhesion of the carrier 4 to the wire. The melting of the glue thus entails that the carrier 4, after removal of the weights, can be lifted off, separating the heating wire 1 from the carrier and leaving it on the substrate. The current supply is then interrupted, e.g. through disconnecting the connector means 23 from the voltage source, whereupon the heating wire will cool down to a temperature below the melting temperature of the glue. This leads to the glue achieving full adhesive action against the topside 14 of the substrate 13.

Figure 4:
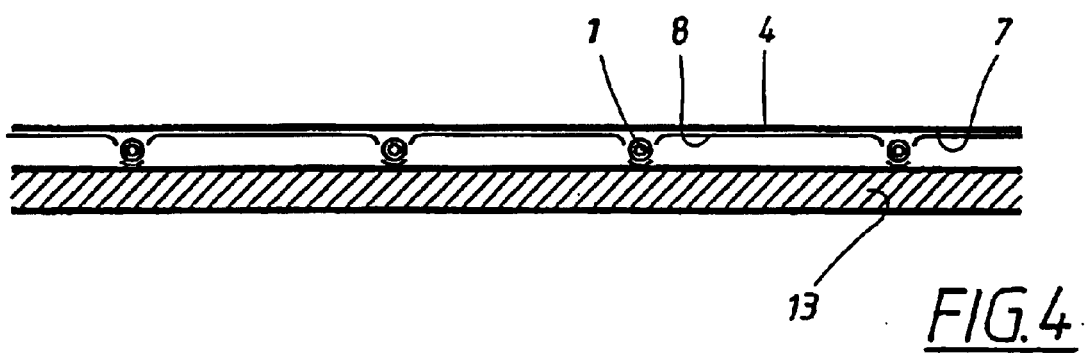
Figure 5:
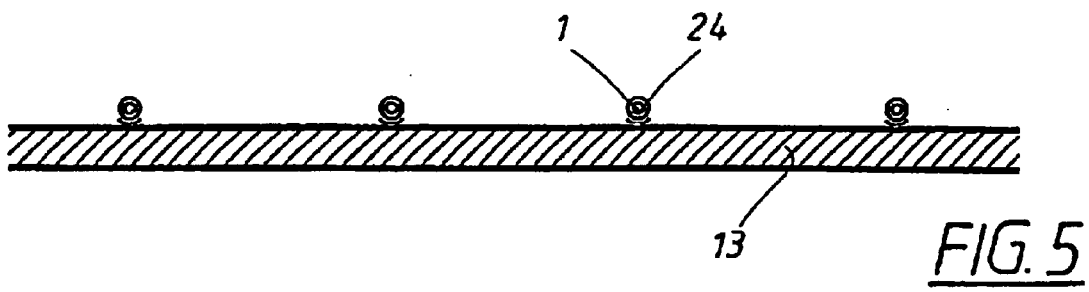

It may be gathered from FIG. 4, that the glue on the envelope surface of the heating wire is substantially missing over that portion of its circumference where it is least needed, that is at the portion of the circumference directed away from the substrate 13. This may however be more ore less evident. This entails that, at a stage after the described application stage, the transport carrier 4 can be removed, preferably starting from one edge 15 of the carrier, by lifting it off the wire and the substrate. The heating wire thereby remains on the substrate and the carrier can be removed completely, see FIG. 5. The glue will then be concentrated onto exactly those portions where is to function as an adhesive, i.e. between the heating wire 1 and the substrate 13.

Figure 6:
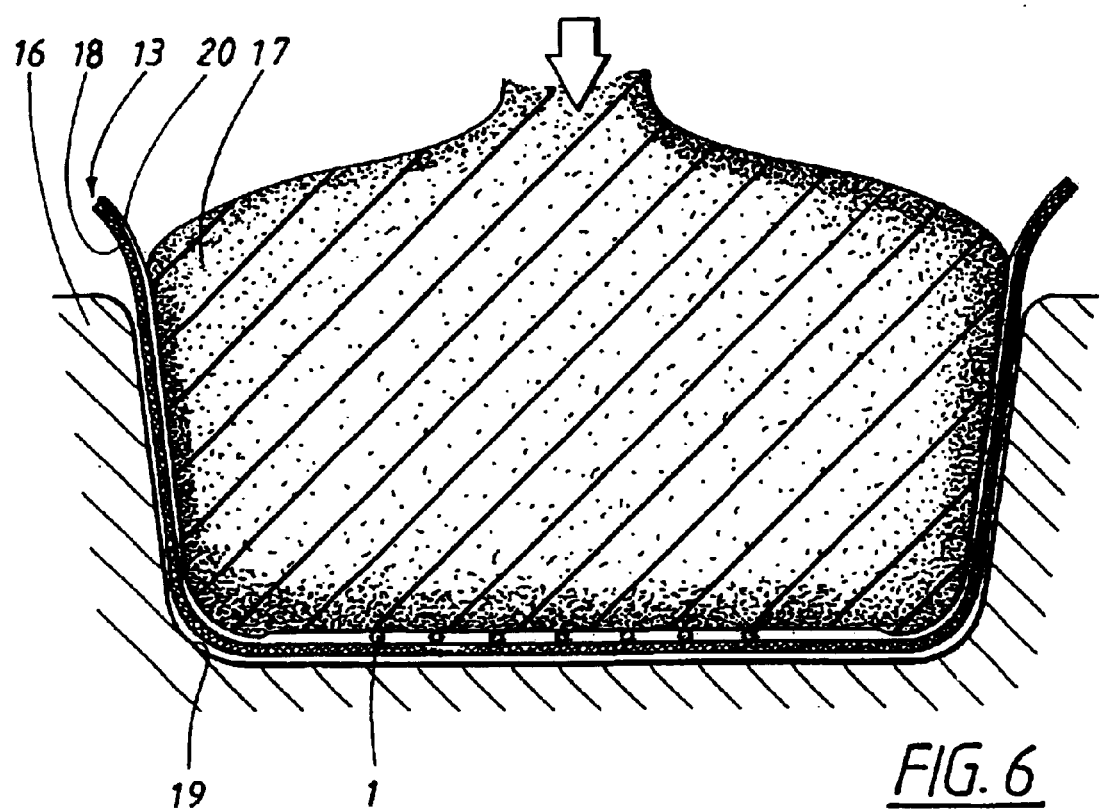
FIG. 6 is a cross-section through a vehicle seat with a heating element during the manufacturing process for the complete seat.

The manufacture of a vehicle seat with a heating element will now be described by way of an example, with reference to FIG. 6. The method according to the invention can be used by that type of vehicle seat manufacture where the filling or core forming the resilient comfort-providing carrier for the upholstery material is not formed before applying of the upholstery onto the finished core, but is formed by means of filling expanding cold foam, e.g. polyurethane foam, into a mould 16, to form the comfort-providing, resilient core 17.

The upholstery material 13 is initially placed into the mould 18 with its outside, made e.g. of a textile layer 18, turned towards the wail 19 of the mould. The upholstery material may, besides the textile material, comprise an internal layer 20 of e.g. polyurethane film, fixedly applied directly onto the fabric layer or onto an intermediate foam material. The upholstery material 13 is produced and finished in an earlier stage, through for example flame lamination or gluing. The heating element according to the invention may, in a previous stage, e.g. by a supplier of upholstery material, be applied to the inside of the upholstery material, that is against its internal layer 20, or may be paced into the mould 16 against the upholstery material in a separate stage.

If the heating element has not been applied before, the transfer and adhesion of the heating element, i.e. the heating wire, is performed in the manner described above, the upholstery material thus defining the substrate 13. In the illustrated example, the layer 20 and the glue may be of the same material, e.g. polyamide, polyurethane, or similar. Hereby, the heating loop is affixed to the upholstery material 14.

The heating element is then completely oriented and affixed in relation to the upholstery material, whereupon the core 13 is created through filling of the cold foam 13, the foam then expanding in a fermentation process and entirely filling the interior of the mould and being connected to the inner layer 9 of the upholstery material, said layer also being of the same material as the foam material, i.e. polyurethane. The layer 9 furthermore prevents the expanding foam from penetrating into and through the upholstery material.

The vehicle seat in question or, more specifically, one part thereof, is thus substantially ready after cutting it clean and applying a backside layer, if any. It is not shown in the figure, but already in connection with its application, the heating element will be provided wit the feeder lines, extending between the upholstery material and the core, as well as with said electrical connector means for connection to a not shown control unit for control of the power supplied from the vehicle voltage source.

The invention will not be limited to the embodiments described above and illustrated in the drawings, but can be varied within the scope of the appended claims. It will be understood that the heating wire is in close contact with the temporary carrier 4 as well as the upholstery and the core even if, for the sake of clarity, the various components are shown with intermediate distances. As mentioned above, the heating element can be fitted to other substrates in the vehicle, e.g. panels, roof, instrument panel, etc. When fitting in vehicle seats, other methods than the one described for seats could be used.

What is claimed is:

1. A method for production and application of a heating elements for heating in vehicles, said heating element consisting of a heating wire defining at least one electric heating loop extending in a predetermined pattern, said method comprising the steps of:

positioning the heating wire onto at least one side of a temporary carrier, applying an adhesive over said carrier at least over areas where the heating wire is lying on the carrier, and over the heating wire, causing the heating wire to adhere to the surface of the carrier, transporting the carrier with the heating wire to a substrate, wherein the heating wire is adjacent to the substrate, pressing the heating wire against the substrate, heating and melting the adhesive in order to separate the heating wire from the carrier leaving the heating wire adhered to the substrate, and removing the carrier, so that the heating wire is released from the carrier and adheres to the substrate, to form the heating element for heating in the vehicle.

2. The method according to claim 1, wherein the adhesive is applied through spraying across the heating wire and the carrier surface on the at least one side where the heating wire is positioned.

3. The method according to claim 2, wherein the carrier absorbs the adhesive so that surface of the carrier will only obtain negligible adhesive ability.

4. The method according to claim 1 wherein the adhesive is a thermoglue heated and maintained at a temperature above the melting point of the thermo-glue when the thermo-glue is applied onto the heating wire and the carrier as well as when the wires have been applied onto the substrate.

5. The method according to claim 4, wherein the heating is obtained through the supply of electric current through the heating wire.

6. The method according to claim 5, wherein the supply of electric current is achieved through connecting the heating wire to an electric power source via one or more electrical connector means intended for connection of the heating element to the vehicle voltage source when in a final operating position in the vehicle.

* * * * *

UNITED STATES PATENT AND TRADEMARK OFFICE
CERTIFICATE OF CORRECTION

PATENT NO. : 6,792,671 B1
DATED : September 21, 2004
INVENTOR(S) : Peter Oberg

It is certified that error appears in the above-identified patent and that said Letters Patent is hereby corrected as shown below:

Column 1,
Line 47, delete "dose" and insert -- close --.

Column 4,
Line 67, delete "wail" and insert -- wall --.

Column 5,
Line 33, delete "wit" and insert -- with --.

Column 6,
Line 3, delete "elements" and insert -- element --.
Line 31, insert -- a -- between "that" and "surface."

Signed and Sealed this

Fifth Day of April, 2005

JON W. DUDAS
*Director of the United States Patent and Trademark Office*